(12) United States Patent
Feyh et al.

(10) Patent No.: US 6,396,788 B1
(45) Date of Patent: May 28, 2002

(54) RE-TIMING AND UP-SAMPLING A SUB-SAMPLED USER DATA SIGNAL FROM IN AN OPTICAL DISK

(75) Inventors: German S. O. Feyh, Boulder; James Mark Graba, Longmont; William G. Bliss, Thornton, all of CO (US); Chung-Kal Chow, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/351,839

(22) Filed: Jul. 13, 1999

(51) Int. Cl.$^7$ ................................................. G11B 5/09
(52) U.S. Cl. .............................. 369/59.22; 369/124.05; 360/51
(58) Field of Search ..................... 369/124.05, 124.07, 369/59.21, 59.22, 47.18; 360/51, 40; 375/350, 355; 714/792; 341/59

(56) References Cited

U.S. PATENT DOCUMENTS

| | | |
|---|---|---|
| 4,866,647 A | 9/1989 | Farrow |
| 5,696,639 A | 12/1997 | Spurbeck et al. |
| 5,726,818 A | 3/1998 | Reed et al. |
| 5,760,984 A | 6/1998 | Spurbeck et al. |
| 5,850,377 A | 12/1998 | Taguchi et al. |
| 5,872,754 A * | 2/1999 | Taguchi et al. .......... 369/59.14 |
| 5,909,332 A | 6/1999 | Spurbeck et al. |
| 5,956,304 A | 9/1999 | Supino et al. |
| 5,986,990 A * | 11/1999 | Moon .................... 369/124.05 |
| 6,032,284 A * | 2/2000 | Bliss ........................... 341/59 |
| 6,097,685 A * | 8/2000 | Yamaguchi et al. ..... 369/59.22 |

FOREIGN PATENT DOCUMENTS

EP  0 805 447 A2  5/1997

OTHER PUBLICATIONS

Hwang, Chan Soo and Lee, Yong Hoon, "Half of Symbol Rate Sampling for High Density DVD Channels," R&D Center, Samsung Electronics Co., Ltd., Dept. of EE, Kaist.
Stikvoort, Eduard F., "An All–Digital Bit Detector for Compact Disc Players," IEEE Journal on Selected Areas in Communications, vol. 10 (No. 1), p. one, (Nov. 17, 1992).
Feyh, G., "Subsampled Digital Retiming for Optical Disk," Cirrus Logic, Inc., Cirrus Logic, Inc. (Broomfield, CO), p. three.

* cited by examiner

*Primary Examiner*—Thang V. Tran

(57) ABSTRACT

An optical disk system comprises an optical disk device and control circuitry. The optical disk device stores user data and transfers an analog signal representing the user data to the control circuitry. The control circuitry sub-samples the analog signal to generate a sub-sampled signal. The control circuitry up-samples and re-times the sub-sampled signal using a control signal to generate an up-sampled and re-timed signal. A digital feedback loop in the control circuitry generates the control signal.

42 Claims, 13 Drawing Sheets

RE-TIMING AND UP-SAMPLING A SUB-SAMPLED USER DATA SIGNAL FROM IN AN OPTICAL DISK

BACKGROUND OF THE INVENTION

1. Field of the Invention

The invention is related to the field of optical disk systems, and in particular, to optical disk systems and circuitry that re-time and up-sample a sub-sampled user data signal using a digital feedback loop.

2. Statement of the Problem

FIG. 1 depicts a conventional optical disk system 100 that is comprised of an optical disk device 101 and a read channel 102. The optical disk device 101 stores user data 103 on an optical disk 104, and also includes an optical pickup 105. The read channel 102 comprises an amplifier and filter 106, an analog-to-digital converter 107, an equalizer 108, a re-timer 109, a detector 110, and a decoder 111. In operation, the optical pickup 105 obtains a signal 113 from the optical disk 104. The signal 113 represents physical transitions that encode the user data 103 on the optical disk 104. The optical pickup 105 provides a corresponding analog signal 114 to the amplifier and filter 106. The amplifier and filter 106 amplifies and filters the analog signal 114 to provide the amplified-filtered analog signal 115 to the analog-to-digital converter 107.

The analog-to-digital converter 107 samples the analog signal 115 to generate a sampled signal 116. The sampling rate is greater than 1/T where T is the is the bit period for the bits on the optical disk 104 that encode the user data 103. In other words, the analog signal 115 is sampled at least once for each encoded bit on the optical disk 104. The analog-to-digital converter 107 provides the sampled signal 116 to the equalizer 108. The equalizer 108 processes the sampled signal 116 to provide an equalized-sampled signal 117 to the re-timer 109.

The re-timer 109 processes the signal 117 to move samples to times expected by the detector 110. The re-timer 109 provides a re-timed signal 118 to the detector 110. The detector 110 identifies encoded bits from the re-timed signal 118 to generate an encoded signal 119 for the decoder 111. The decoder 111 derives the data signal 120 from the encoded signal 119. The data signal 120 carries user data 112 that should replicate the user data 103 on the optical disk 104.

FIG. 2 depicts the conventional re-timer 109 from FIG. 1. The re-timer 109 is comprised of adder 221, re-timing interpolator 222, moving average filter 223, error detector 224, loop filter 225, digital controlled oscillator 226, and asymmetry control 227. In operation, the adder 221 receives the equalized-sampled signal 117 and adds in an asymmetry control signal 234 to adjust the symmetry of the samples above and below a horizontal axis representing a zero crossing. The adder 221 provides the resulting sampled signal 228 to the re-timing interpolator 222.

The re-timing interpolator 222 adjusts the timing of the samples by moving samples based on the phase control signal 232 from the digital controlled oscillator 226. The samples are placed at approximate times when samples are expected by the detector 110, although these times are later adjusted by the moving average filter 223. The re-timing interpolator 222 provides the re-timed signal 229 to both the moving average filter 223 and to the error detector 224. The moving average filter 223 suppresses interpolation error by averaging the consecutive samples in the re-timed signal 229. This final adjustment by the moving average filter 223 should be taken into account when calculating the phase control signal 232 that is used by the re-timing interpolator 222 to move samples.

The error detector 224 processes the re-timed signal 229 to generate a phase error signal 230 and an asymmetry error signal 233. To calculate these errors, the error detector 224 uses a slicer to detect zero crossings and adds the phase of the two samples on either side of the zero crossing. For phase error calculation, negative results are flipped to positive. The asymmetry control 227 receives and processes the asymmetry error signal 233 to produce the asymmetry control signal 234 that is added to the signal 117 to adjust the symmetry of the samples above and below the zero crossing axis.

The phase error signal 230 is provided to the loop filter 225. The loop filter 225 filters the phase error signal 230 to stabilize the phase error feedback loop by producing a phase error signal 231 for the digital controlled oscillator 226. The digital controlled oscillator 226 processes the phase error signal 231 to generate the phase control signal 232 for the re-timing interpolator 222. The phase control signal 232 indicates the number of samples in the sampled signal 228 from the current sample to the last sample before a sample is expected by the detector 110. The phase control signal also indicates the phase from this last sample to the time of the expected sample for the detector 110.

Unfortunately, the conventional re-timer 109 must receive a sampled signal that has been sampled at a rate greater than 1/T where T is the bit period of the bits on the optical disk that encode the user data. The conventional re-timer 109 is unable to process a sub-sampled signal through up-sampling. A sub-sampled signal is sampled at a lower rate than 1/T, for example at 1/2T. The ability to process a sub-sampled signal at 1/2T would effectively double the speed of the optical disk system 100.

Unfortunately, the conventional receiver circuitry 302 does not use rules based on user data encoding to better control both asymmetry and phase errors. Without these rules, bad asymmetry and phase error calculations are allowed into the feedback control loops. More intelligent handling of bad error data would improve the accuracy and speed of the feedback control loops.

Unfortunately, the conventional receiver circuitry 302 cannot process consecutive samples in parallel. This inhibits the use of CMOS technology that produces cheaper and faster circuitry. CMOS circuitry would improve the speed of the re-timing and up-sampling, as well as the feedback control loops.

FIG. 3 depicts another conventional optical disk system 300 that is comprised of an optical disk device 301 and receiver circuitry 302. The receiver circuitry 302 comprises a filter 306, an analog-to-digital converter 307, an interpolator 322, a symbol detector 310, a decoder 311, a phase detector 324, a loop filter 325, and a voltage controlled oscillator 326. In operation, the optical disk device 301 provides an analog signal 314 representing encoded user data to the filter 306. The filter 306 filters the analog signal 314 to provide a filtered analog signal 315 to the analog-to-digital converter 307. The analog-to-digital converter 307 sub-samples the analog signal 115 using the control signal 332 to generate a sub-sampled signal 116. The sub-sampling rate is 1/2T where T is the bit period for the bits that encode the user data. In other words, the-analog signal 315 is sampled once for every two encoded bits on the optical disk device 301. The analog-to-digital converter 307 provides the sub-sampled signal 316 to the interpolator 322.

The interpolator 322 up-samples the sub-sampled signal 316 by adding an estimated sample in between each of the sub-samples to produce an up-sampled signal 329. The symbol detector 310 identifies encoded symbols from the up-sampled signal 329 to generate an encoded signal 319 for the decoder 311. The decoder 311 derives the data signal 320 from the encoded signal 319. The data signal 320 carries user data 312 that should replicate the user data on the optical disk device 301.

The phase detector 324 processes the up-sampled signal 329 to provide a phase error signal 330 to the loop filter 325. The phase error signal 330 indicates the phase error between the samples in the estimated sampled signal 329 and the phase expected by the symbol detector 310. The loop filter 325 filters the phase error signal 330 to produce a control voltage 331 for the voltage controlled oscillator 326. The loop filtering stabilizes the phase error feedback loop. The voltage controlled oscillator 326 provides the control signal 332 to the analog-to-digital converter 332 to synchronize the sub-sampling with the phase of the symbol detector 310.

Unfortunately, the conventional receiver circuitry 302 does not use a re-timing interpolator, but attempts to synchronize the sampling rate in the analog-to-digital converter 307 to the expected sample times for the symbol detector 310. Sampling rate control is exerted through an analog feedback loop through the phase detector 324 to the analog-to-digital converter 307. The inclusion of the analog-to-digital converter 307 in the feedback loop undesirably lengthens the loop delay time. This undesirable loop delay is further lengthened through the use of analog circuitry in the feedback loop. A shorter feedback loop using digital logic would significantly shorten the loop delay.

Unfortunately, the conventional receiver circuitry 302 does not use rules based on user data encoding to better control both asymmetry and phase errors. This allows bad asymmetry and phase error calculations into the feedback control loops. More intelligent handling of bad error data would improve the accuracy and speed of the feedback control loops.

Unfortunately, the conventional receiver circuitry 302 cannot process consecutive samples in parallel. This inhibits the use of CMOS technology that produces cheaper and faster circuitry. CMOS circuitry would improve the speed of the re-timing and up-sampling, as well as the feedback control loops.

There is an acute need to continually improve the speed of optical disk systems. In particular, solutions are needed to reduce problems with sub-sampling and re-timing. These solutions will provide for faster and more accurate optical disk systems.

SUMMARY OF THE SOLUTION

The invention solves the above problems by providing improved optical disk systems and circuitry that up-sample and re-time a sub-sampled signal using a digital feedback control loop. Advantageously, the invention is able to process a sub-sampled signal to effectively double the speed of the optical disk system. In some embodiments, the invention uses rules to intelligently handle bad error data to improve the accuracy and speed of the feedback control loops. In some embodiments, the invention process two samples in parallel to allow the use of CMOS technology that produces cheaper and faster circuitry.

The invention comprises optical disk systems, circuitry, and methods. An optical disk device stores user data and transfers an analog signal representing the user data to control circuitry. The control circuitry sub-samples the analog signal to generate a sub-sampled signal. The control circuitry up-samples and re-times the sub-sampled signal using a control signal to generate an up-sampled and re-timed signal. A digital feedback loop generates the control signal.

In various embodiments of the invention, the control signal indicates phase error between up-sampling circuitry and a detector. A re-timing interpolator between the up-sampling circuitry and the detector re-times the up-sampled signal using the control signal to compensate for phase error. The digital feedback loop processes the output of the re-timing interpolator to provide the control signal back to the re-timing interpolator. The control circuitry suppresses phase error compensation when a run length limited code constraint is violated. In addition to phase error, the control circuitry may also compensate for asymmetry in the sub-sampled signal. The control circuitry selects different samples for asymmetry error calculations when a run length limited code constraint is violated. The control circuitry may also be configured to process consecutive samples in parallel.

DETAILED DESCRIPTION OF THE INVENTION

Figure 1:
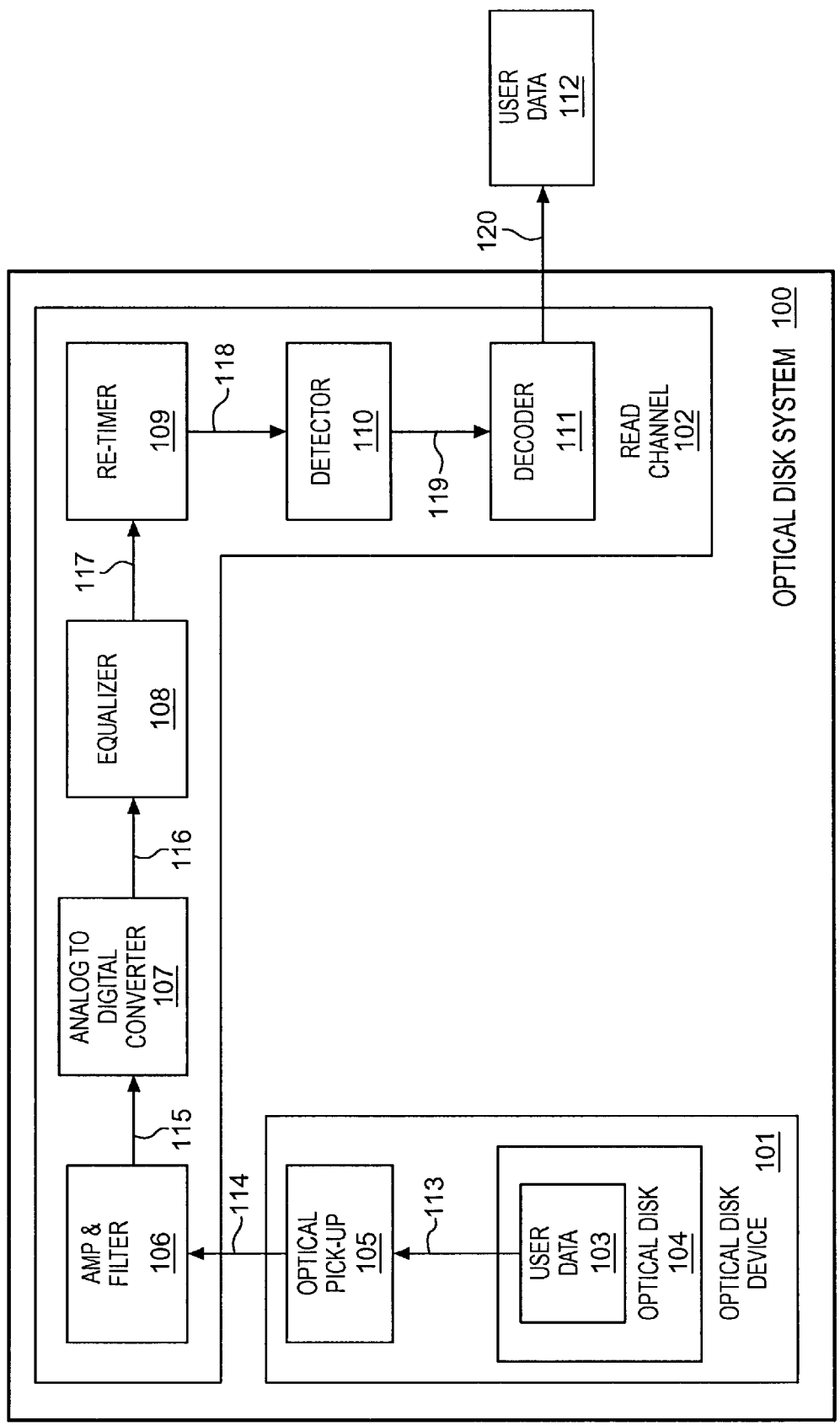
FIG. 1 is a block diagram that depicts a conventional optical disk system.
Figure 2:
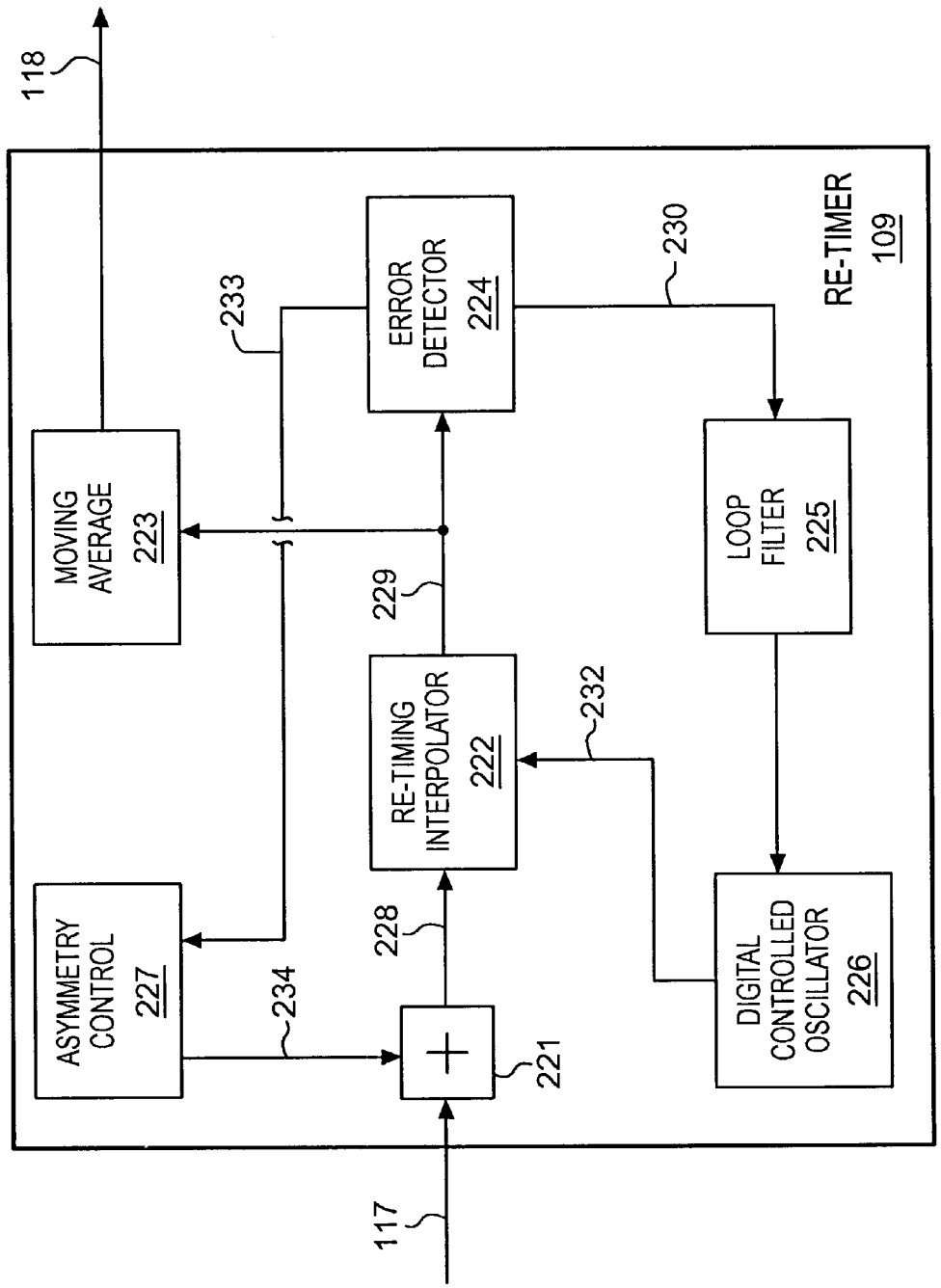
FIG. 2 is a block diagram that depicts a conventional re-timer circuit.
Figure 3:
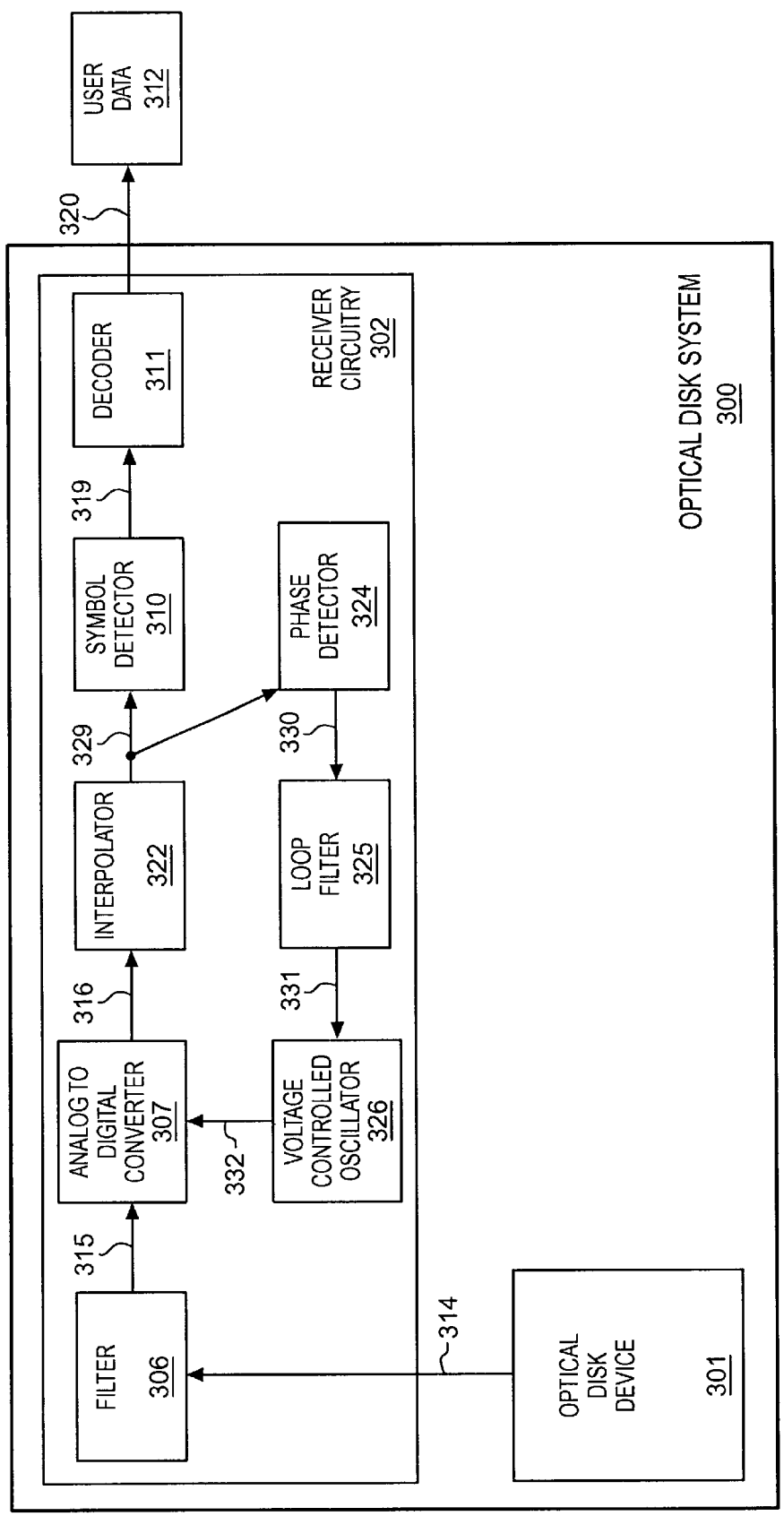
FIG. 3 is a block diagram that depicts a conventional optical disk system.
Figure 4:
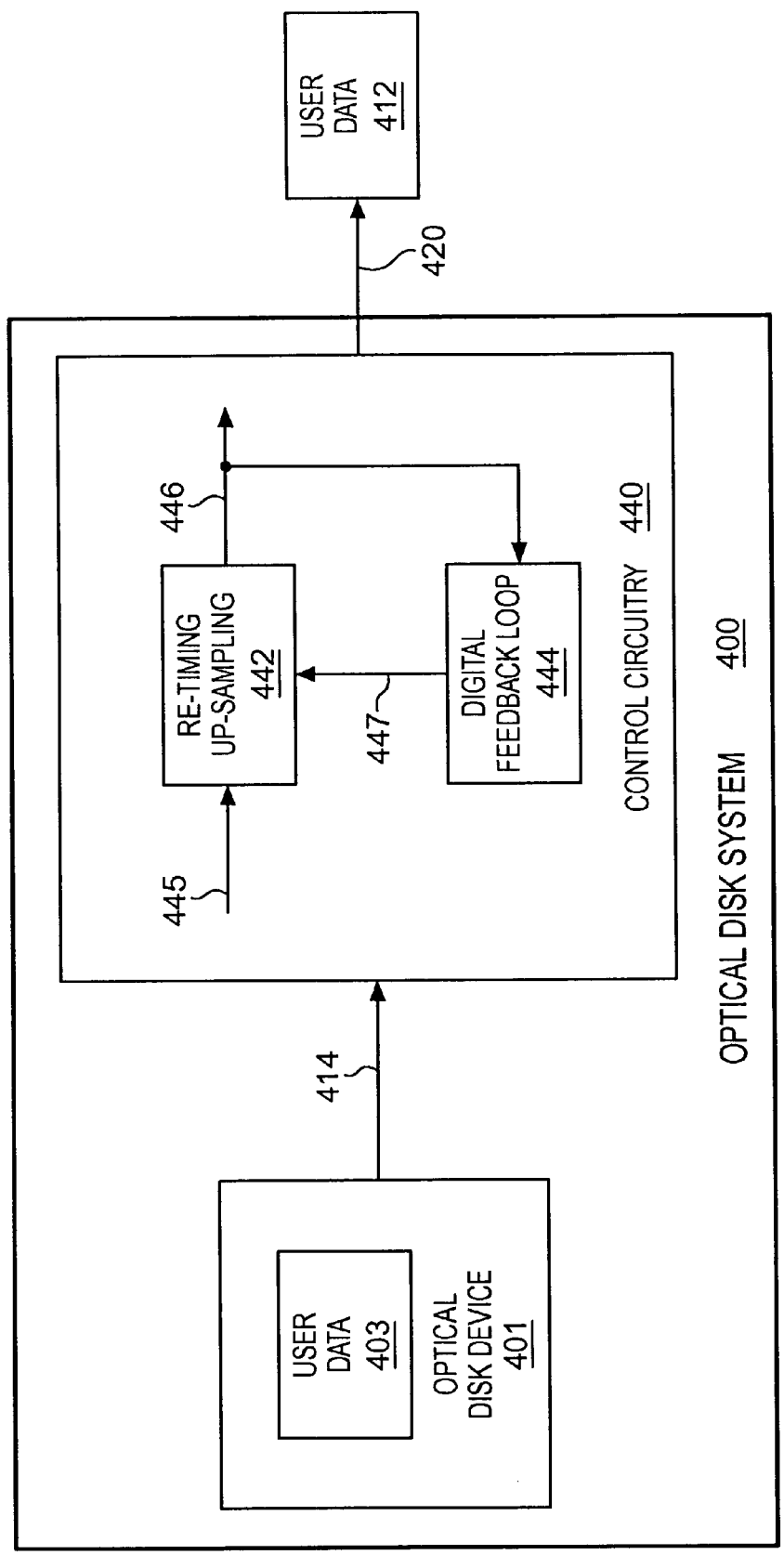
FIG. 4 is a block diagram that depicts an optical disk system in an example of the invention.

Optical Disk System—FIG. 4

FIG. 4 shows an optical disk system 400 in accord with the present invention. The optical disk system 400 includes an optical disk device 401 and control circuitry 440. The optical disk device 401 stores user data 403 and transfers an analog signal 414 representing the user data 403 to the control circuitry 104. The control circuitry 104 processes the analog signal 414 to produce the data signal 420. The data signal 420 carries user data 412 that should replicate the user data 403 stored on the optical disk device 401.

In a distinct advance in the art, the control circuitry 440 includes re-timing and up-sampling circuitry 442 and a digital feedback loop 444. The control circuitry 440 sub-samples the analog signal 414 to generate a sub-sampled signal 445. Sub-sampling occurs when the sampling rate is less than the bit period of the bits on the optical disk device 401 that encode the user data 403. The re-timing and up-sampling circuitry 442 up-samples and re-times the sub-sampled signal 445 using a control signal 447 to generate a re-timed and up-sampled signal 446. This signal 446 includes samples for every bit period of the user data 403 on the optical disk device 401, including samples at times expected by a detector in the control circuitry 440. The control circuitry 440 processes the re-timed and up-sampled signal 446 to generate the data signal 420. The digital feedback loop 444 generates the control signal 447.

Optical Disk Device and Read Channel—FIGS. 5–13

FIGS. 5–13 show a specific example of an optical disk system 500 in accord with the present invention. Note that the samples depicted in FIGS. 7–11 use a simple sinusoidal wave form for illustrative purposes, and are not intended as exact representations of user data signals. Those skilled in the art will appreciate numerous variations from this example that do not depart from the scope of the invention. Those skilled in the art will also appreciate that various features described below could be combined with the above-described embodiment to form multiple variations of the invention.

Figure 5:
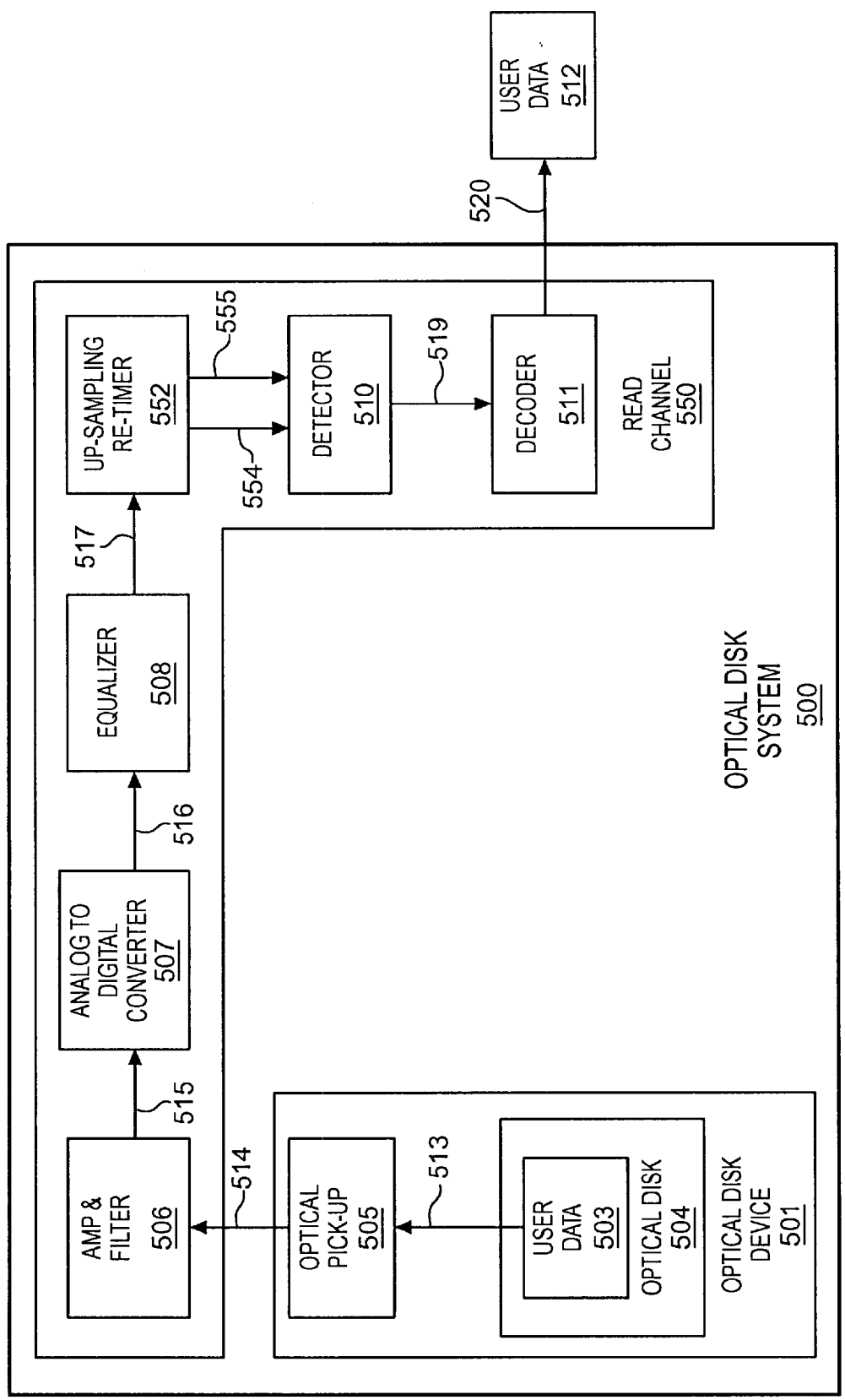
FIG. 5 is a block diagram that depicts an optical disk device and a read channel in an example of the invention.

FIG. 5 depicts the optical disk system 500 that is comprised of an optical disk device 501 and a read channel 550. The optical disk device 501 stores user data 503 on an optical disk 504, and also includes an optical pickup 505. The read channel 550 comprises an amplifier and filter 506, an analog-to-digital converter 507, an equalizer 508, an up-sampling re-timer 552, a detector 510, and a decoder 511. In operation, the optical pickup 505 obtains a signal 513 from the optical disk 504. The signal 513 represents physical transitions that encode the user data 503 on the optical disk 504. The optical pickup 505 provides a corresponding analog signal 514 to the amplifier and filter 506. The amplifier and filter 506 amplifies and filters the analog signal 514 to provide the amplified-filtered analog signal 515 to the analog-to-digital converter 507.

The analog-to-digital converter 107 sub-samples the analog signal 515 to generate a sub-sampled signal 516. The sub-sampling rate could be lower than 1/T where T is the bit period for the bits in the optical disk 504 that encode the user data 503. For a sub-sampling rate of 1/2T, the analog signal 515 is sampled at least once for every two bits on the optical disk 504 that encode the user data 503. The analog-to-digital converter 507 provides the sub-sampled signal 516 to the equalizer 508. The equalizer 508 processes the sub-sampled signal 516 to provide an equalized sub-sampled signal 517 to the up-sampling re-timer 552.

The up-sampling re-timer 552 up-samples and re-times the sub-sampled signal 517 to generate a re-timed and up-sampled signal 517. This re-timed and up-sampled signal 517 includes samples for every bit period of the user data 503 on the optical disk device 501, including samples at times expected by the detector 510. The up-sampling re-timer 552 processes consecutive samples in parallel to provide up-sampled and re-timed signals 554 and 555 to the detector 510. The detector 510 uses a Viterbi algorithm to process the signals 554 and 555 in parallel to generate an encoded signal 519 for the decoder 511. The decoder 511 derives the data signal 520 from the encoded signal 519. The data signal 520 carries user data 512 that should replicate the user data 503 on the optical disk 504.

Figure 6:
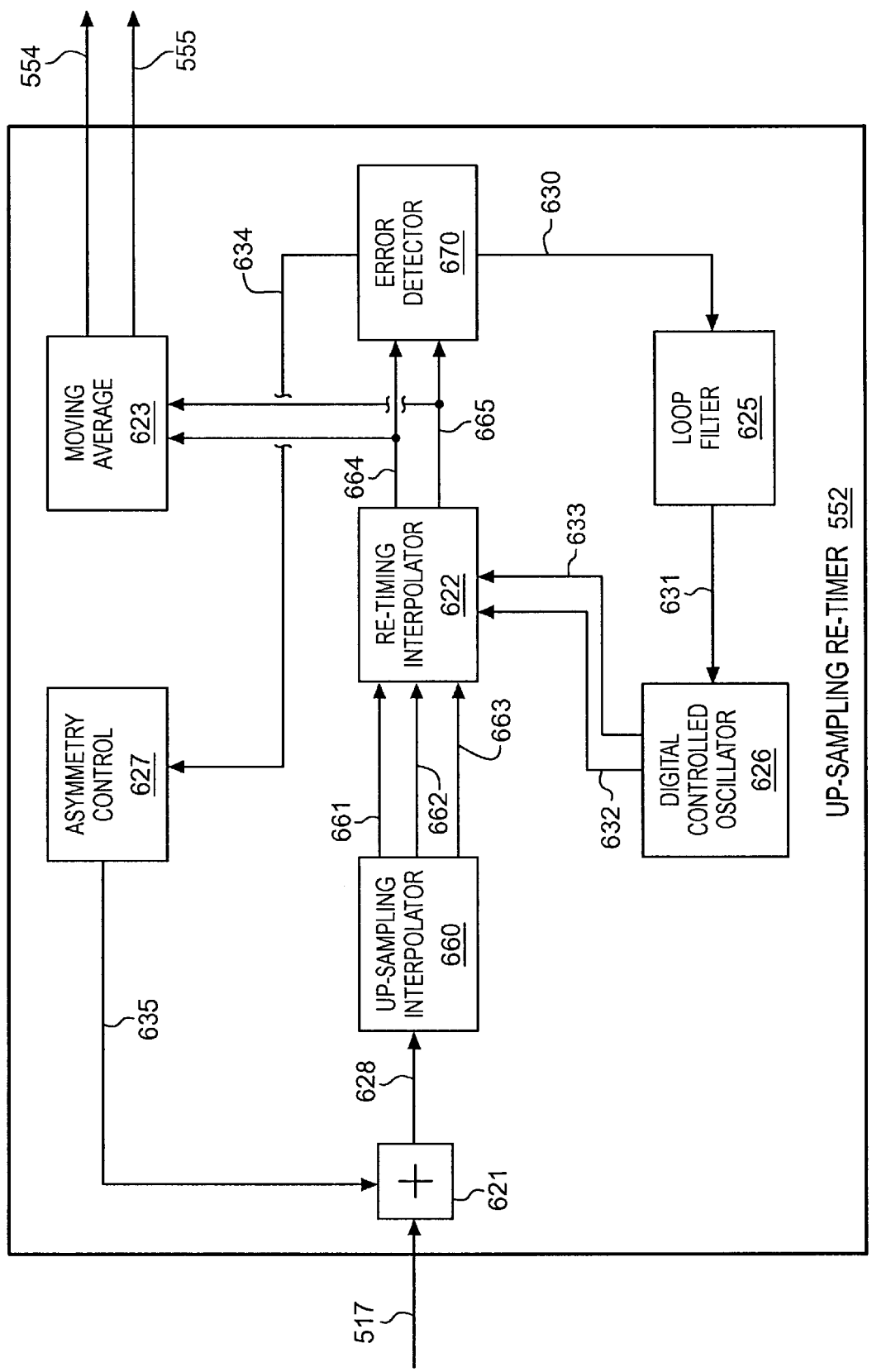
FIG. 6 is a block diagram that depicts a re-timer circuit in an example of the invention.

FIG. 6 depicts the up-sampling re-timer 552 from FIG. 5. The up-sampling re-timer 552 is comprised of adder 621, up-sampling interpolator 660, re-timing interpolator 622, moving average filter 623, error detector 670, loop filter 625, digital controlled oscillator 626, and asymmetry control 627. Up-sampling entails adding estimated samples based on the sub-samples to get to an estimated 1/T sampling rate. Re-timing entails estimating the sampling times that the detector 510 expects and interpolating samples to those sample times.

Figure 7:
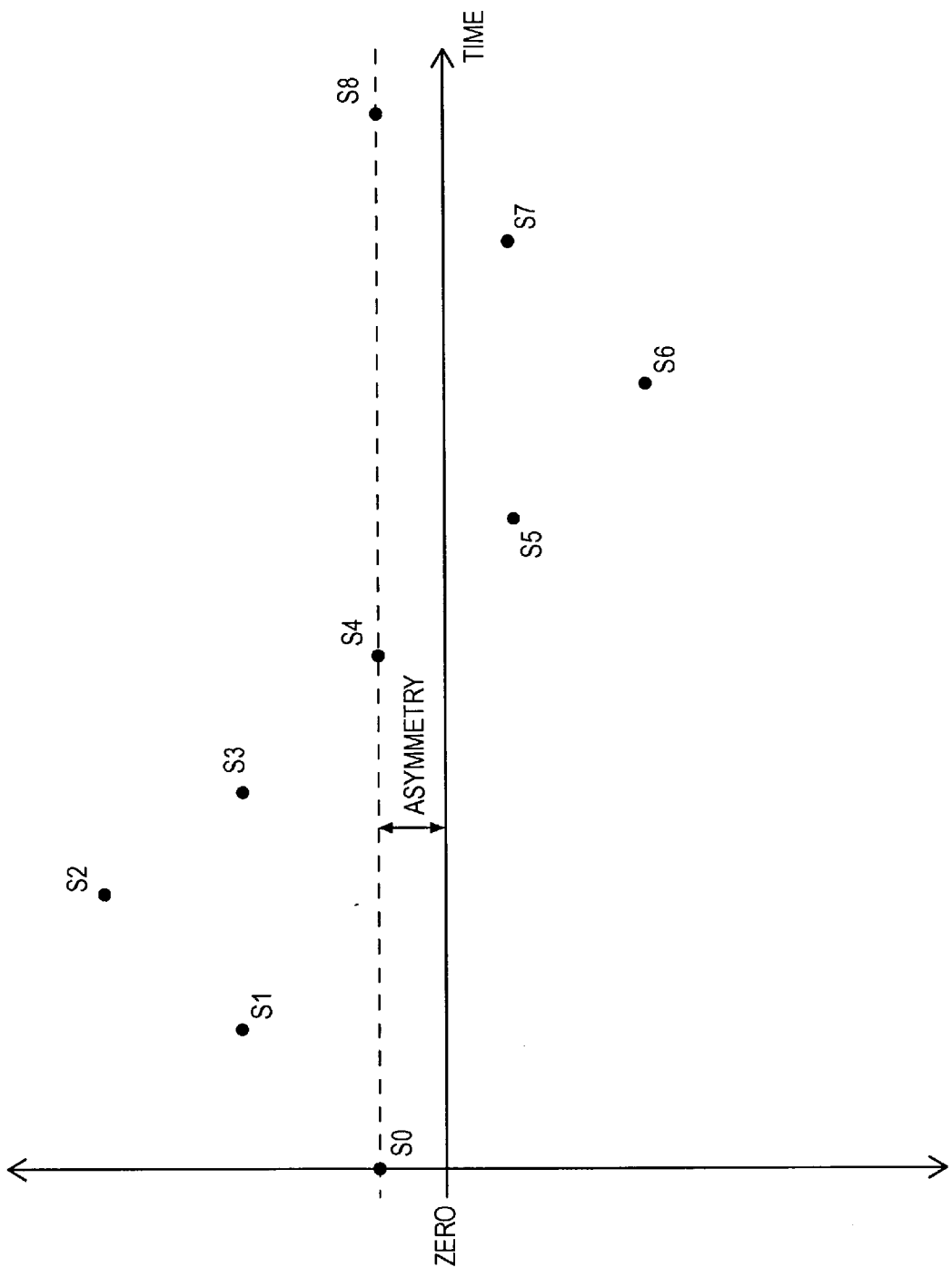
FIG. 7 is a diagram illustrating asymmetry in an example of the invention.
Figure 8:
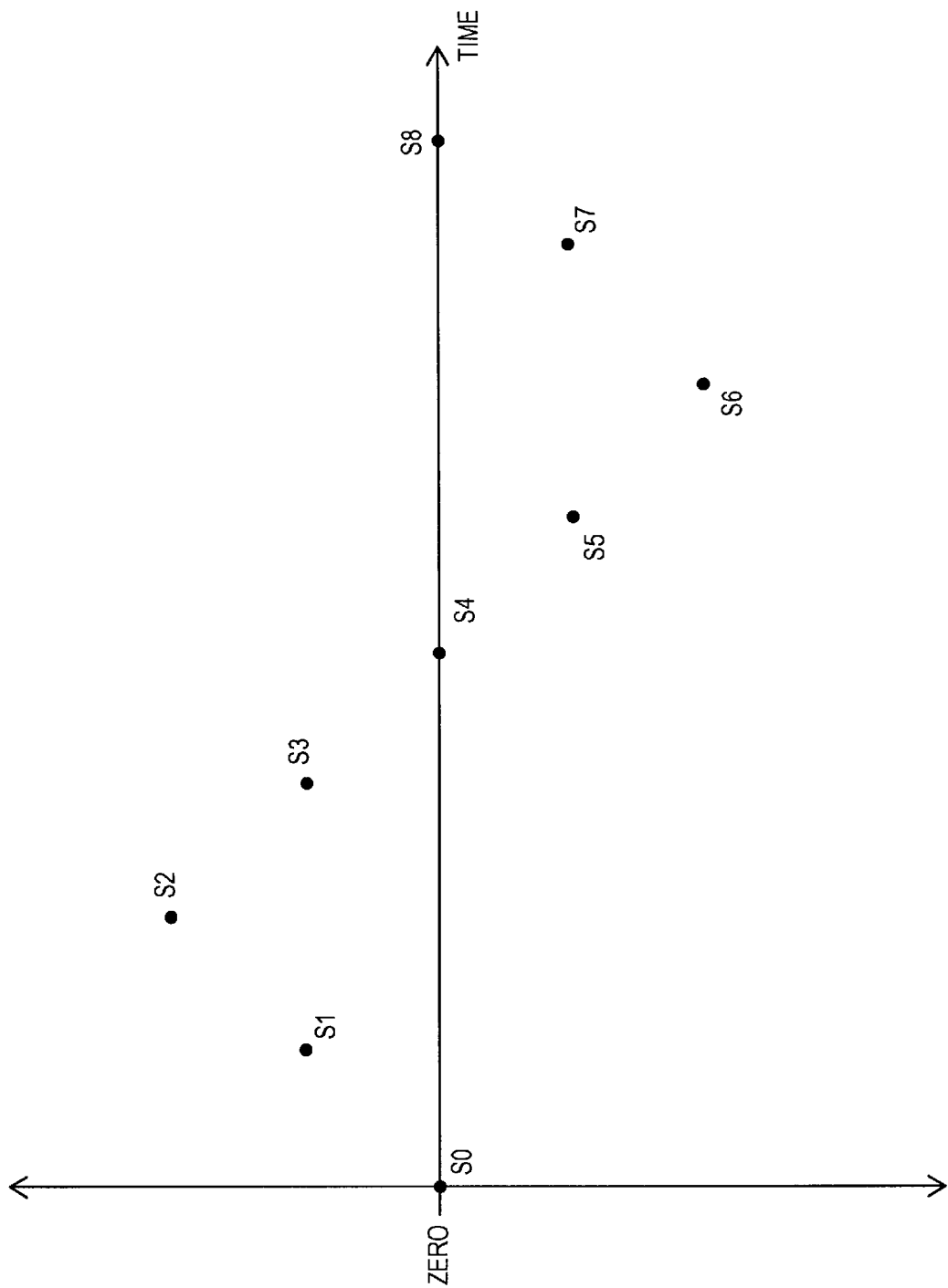
FIG. 8 is a diagram illustrating symmetry in an example of the invention.

In operation, the adder 621 receives the equalized sub-sampled signal 517 and adds an asymmetry control signal 635 to adjust the symmetry of the samples above and below the zero crossing axis. The adder 621 provides the resulting symmetric sub-sampled signal 628 to the up-sampling interpolator 660. FIG. 7 depicts a series of sub-samples S0–S8 in the equalized sub-sampled signal 517, and FIG. 8 depicts the sub-samples S0–S8 after asymmetry has been corrected for the resulting symmetric sub-sampled signal 628. It should be noted that the sub-samples S0–S8 are moved down to remove the asymmetry depicted on FIG. 7 and to center the sub-samples S0–S8 about the horizontal zero crossing axis in FIG. 8. Rules for asymmetry control are discussed in further detail below.

Figure 9:
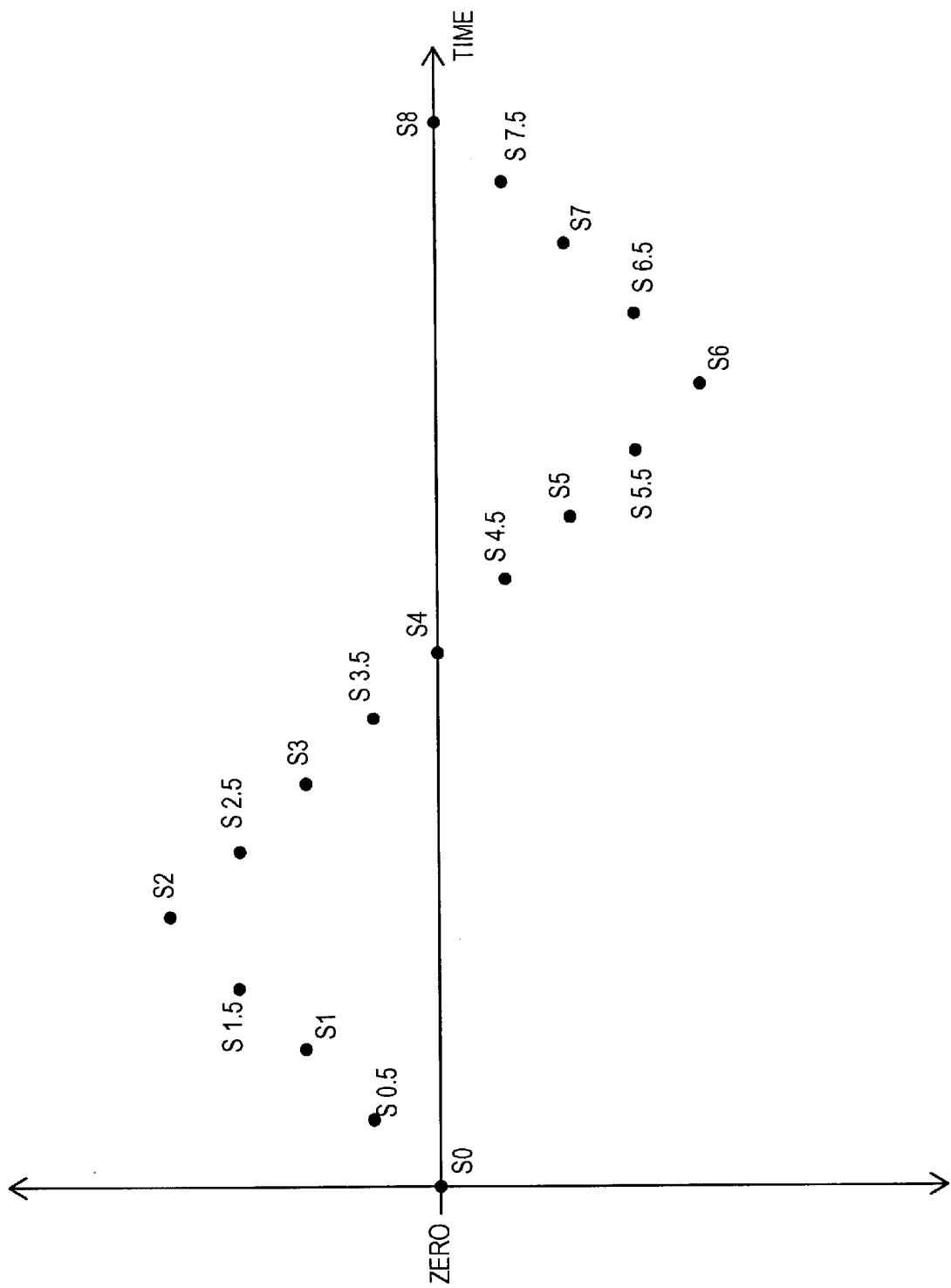
FIG. 9 is a diagram illustrating up-sampling interpolation in an example of the invention.
Figure 10:
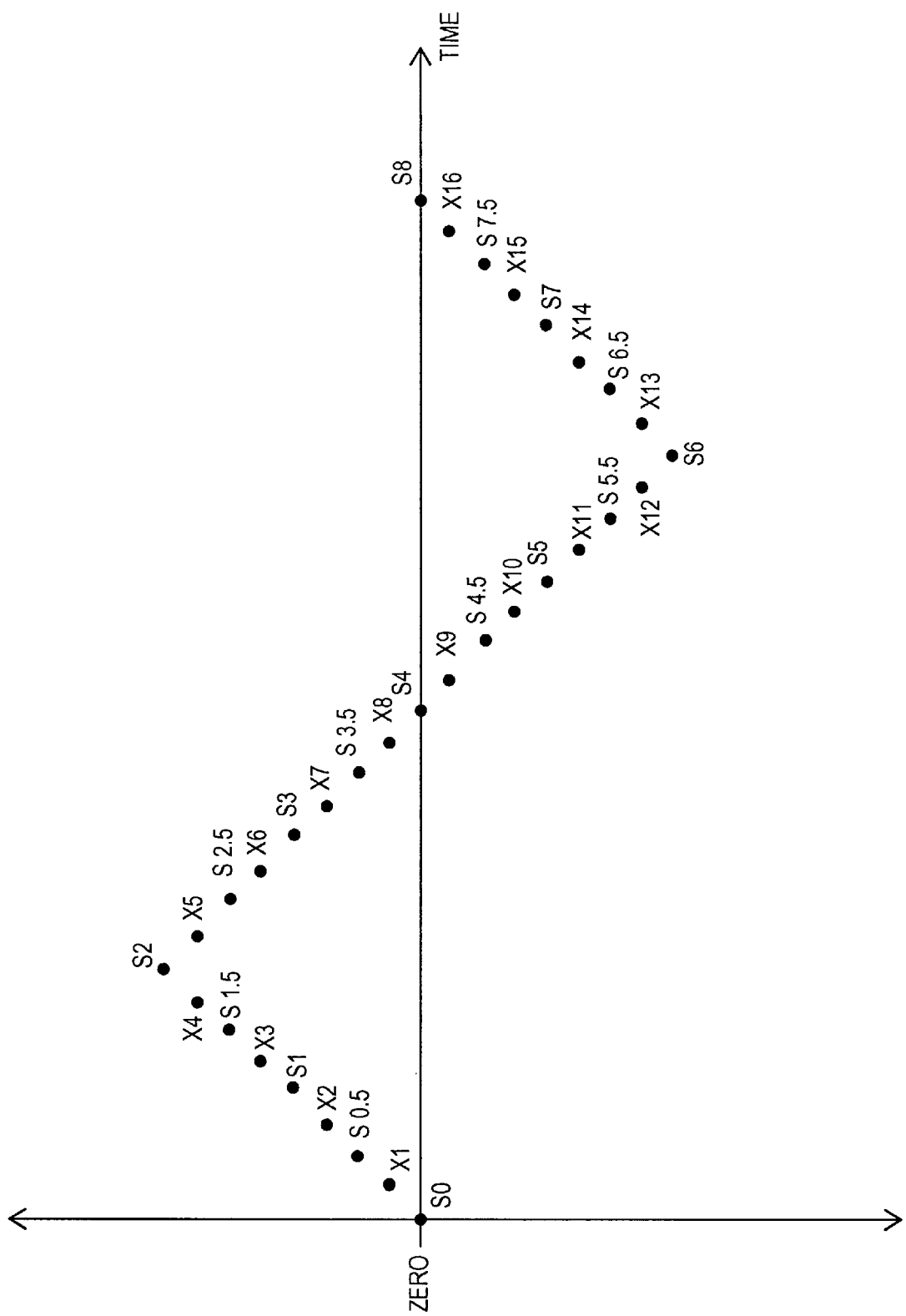
FIG. 10 is a diagram illustrating re-timing interpolation in an example of the invention.
Figure 11:
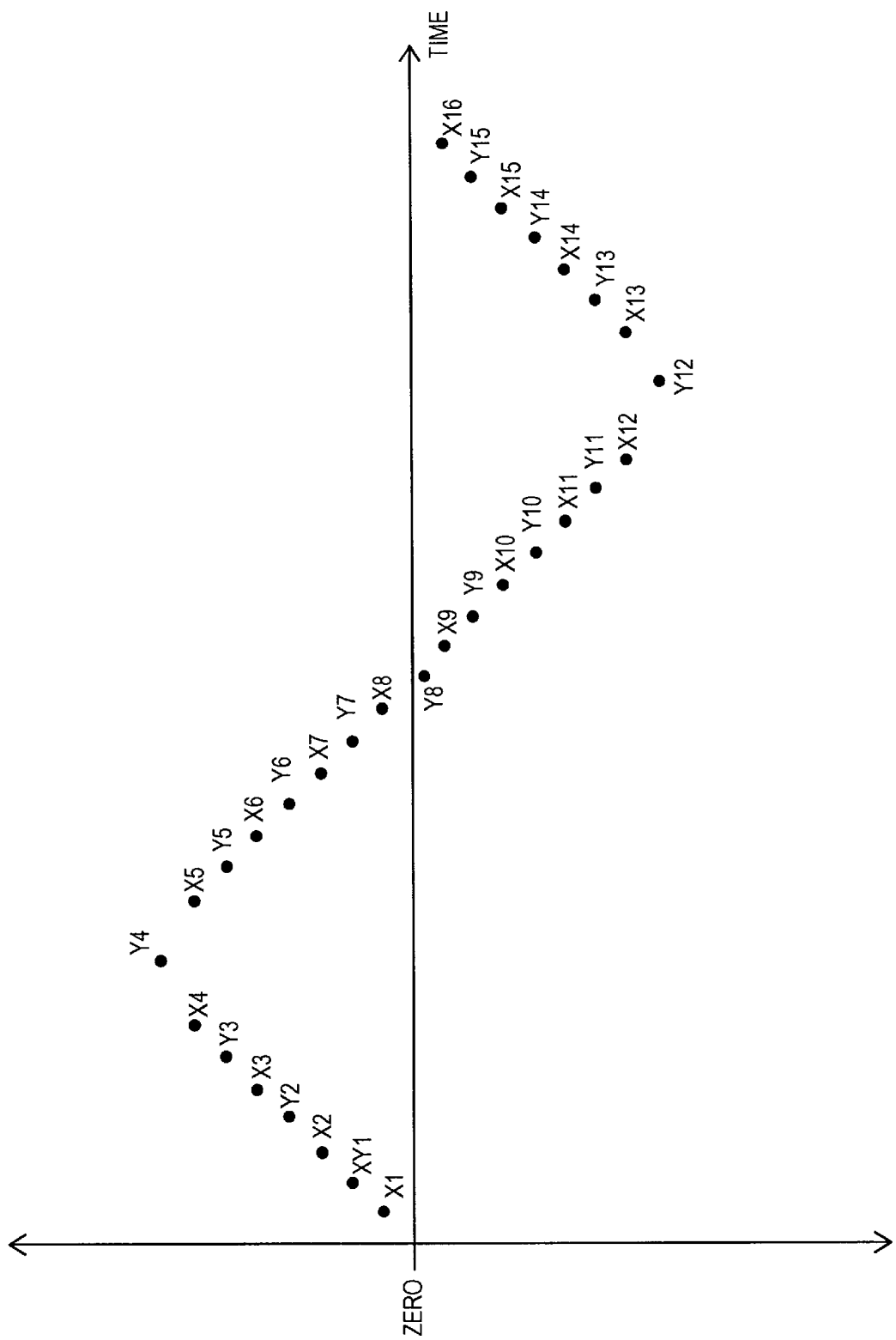
FIG. 11 is a diagram illustrating moving average filtering in an example of the invention.

FIG. 9 shows how the up-sampling interpolator 660 up-samples the sub-sampled signal 628 by adding up-samples S0.5, S1.5, S2.5, S3.5, S4.5, S5.5, S6.5, and S7.5 in between the respective sub-samples S0–S8. The up-samples may be added halfway between each pair of sub-samples—for example:

$$S1.5=1/2(S1+S2);$$

$$S2.5=1/2(S2+S3);$$

$$S3.5=1/2(S3+S4);$$

and so on for samples S4.5–S7.5.

For additional loft to produce a more realistic sinusoidal wave form, a more complex equation may be used—for example:

$$S1.5=1/2(S1+S2)+1/8(-S0+S1+S2-S3);$$

$$S2.5=1/2(S2+S3)+1/8(-S1+S2+S3-S4);$$

$$S3.5=1/2(S3+S4)+1/8(-S2+S3+S4-S5);$$

and so on for samples S4.5–S7.5

The up-sampling interpolator 660 provides the resulting samples to the re-timing interpolator in signals 661, 662, and 663; where the signal 661 carries the even sub-samples, the signal 662 carries the up-samples, and the signal 663 carries the odd sub-samples. For example, the signals 661–663 could carry S0, S0.5, and S1 respectively.

The re-timing interpolator 622 process the signals 661–663 using the phase control signals 632 and 633 to produce two resulting signals 664 and 665. The following equations provide one example of such processing with the resulting samples depicted on FIG. 10:

$$X1=S0+(S0.5-S0) \times T1;$$

$$X2=S0.5+(S1-S0.5) \times T2;$$

$$X3=S1+(S1.5-S1) \times T3;$$

$$X4=S1.5+(S2-S1.5) \times T4;$$

and so on for X5–XN where

X1, X3, X5, . . . are samples for signal 664;

X2, X4, X6 . . . are samples for signal 665;

T1, T3, T5 . . . are phase correction factors from signal 632;

T2, T4, T6 . . . are phase correction factors from signal 633; and if an error detection rule is violated or if the phase control signals 632–633 indicate that no sample will be expected by the detector 510 during that bit period, then no sample is produced (X=0), and the detector 510 clock is inhibited. This sample suppression is not depicted on FIG. 10.

The resulting signals 664 and 665 are provided to the moving average filter 623 and the error detector 670. The moving average filter 623 suppresses interpolation error by averaging the consecutive samples in the signals 664 and 665. The following equations provide one example of such processing with resulting samples depicted on FIG. 11:

$$Y1 = (X1+X2)/2;$$

$$Y2 = (X2+X3)/2;$$

$$Y3 = (X3+X4)/2;$$

$$Y4 = (X4+X5)/2;$$

and so on for Y5–YN where

Y1, Y3, Y5 . . . are samples for signal 554; and

Y2, Y4, Y6 . . . are samples for signal 555.

Figure 12:
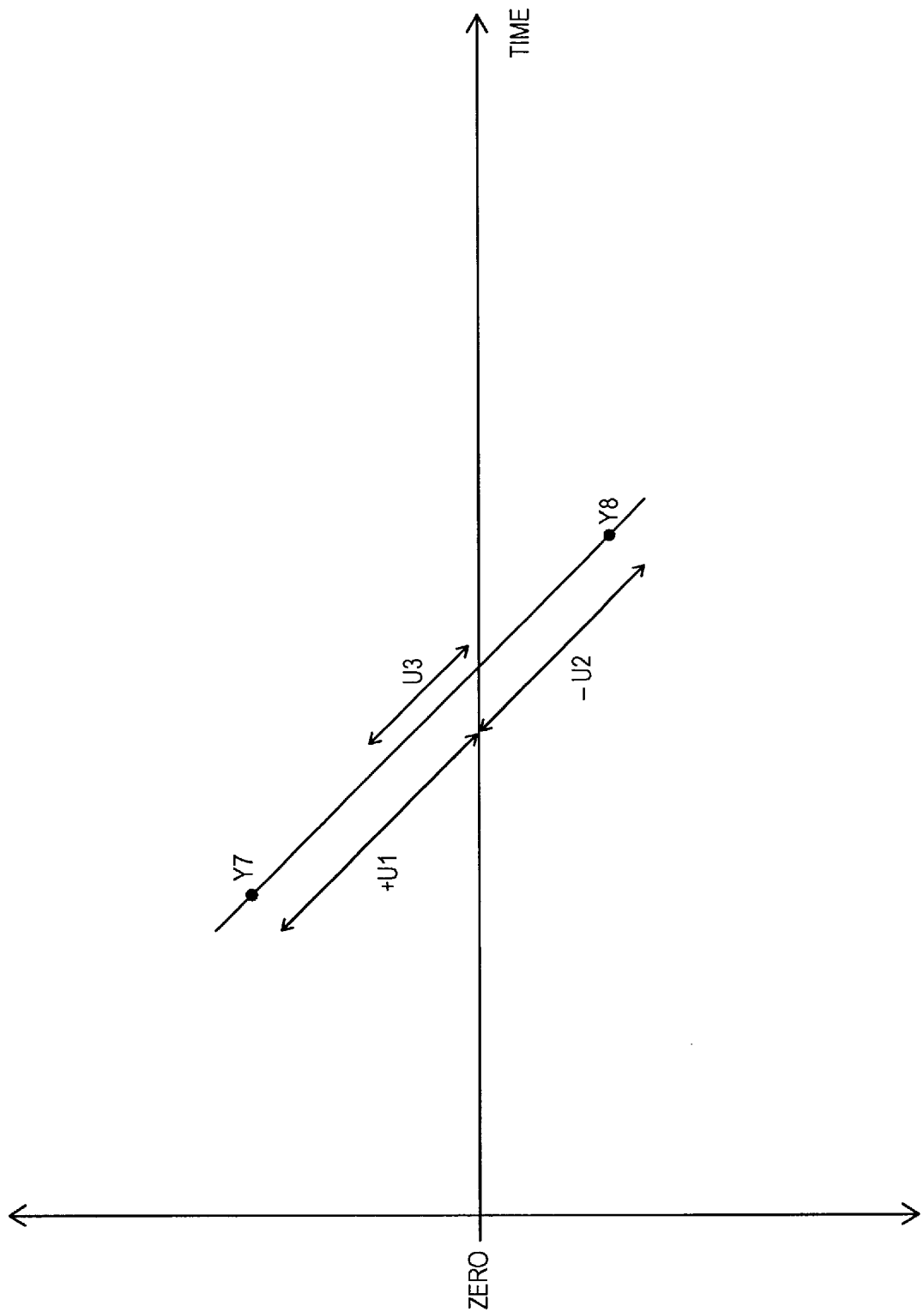
FIG. 12 is a diagram illustrating phase and asymmetry error calculation in an example of the invention.

The error detector 670 processes the signals 664 and 665 to generate the phase error signal 630 and the asymmetry error signal 634. The goal is for samples around a zero crossing to be equidistant. Deviations from this goal are indicated in the phase error signal 630 and the asymmetry error signal 634. To calculate phase and asymmetry error, the error detector 670 uses a slicer to detect zero crossings and adds the phase of the two samples on either side of the zero crossing to obtain asymmetry error for the asymmetry error signal 634. For phase error in the phase error signal 630, every other result is flipped from negative to positive or from positive to negative depending on the sign of the result. FIG. 12 depicts samples Y7 and Y8 on either side of a zero crossing with respective phases +U1 and −U2. The resulting phase and asymmetry error U3=+U1+(−U2). This calculation also occurs in the moving average filter 623 and may be shared.

The asymmetry control 627 receives and processes the asymmetry error signal 634 to produce the asymmetry control signal 635 that is added to the signal 517 to adjust the symmetry of the samples above and below the zero crossing axis. If the user data 503 is encoded using a run-length limited code with (2,10) constraints, then intelligent rules may be used to mitigate the effect of errors in asymmetry calculations. The encoding constraint means that after a transition from negative to positive, at least two more positive bits must be present before a transition back to negative, and after a transition from positive to negative, at least two more negative bits must be present before a transition back to positive. Since a zero crossing represents a transition from positive to negative or from negative to positive, then another zero crossing should not occur for at least two more samples. If this rule is violated, then the asymmetry calculation is in error. Given a string of samples S1–S4 where only sample S3 is between zero crossings, then samples S1 and S4 should be used for the asymmetry error calculation. If only samples S2 and S3 are between zero crossings then samples S1 and S4 should be used for the asymmetry error calculation. An example of pseudo-code for asymmetry control follows.

```
On each decimated clock cycle {
    AE = 0;            //Default outputs.
    PE = 0;
    ZCO = ZC1 = 0;
    if NOS0 == 1 {
        ZeroCrossing = ((LastInterp*Interp0<0||
        (Interp0==0&&LastInterp!=0)) ? 1 : 0);
        shift ZeroCrossing into ZCfifo;
        ifZCfifo has a 1 in position 2 only {
            PE = -RshFifo(1) * SlicerFifo(1);
            AE = RshFifo(1);
        } else {            //Zerocrossings violate the d constraint.
            ifZCfifo has a 1 in position 2 and (a 1 in position 1 or 3) {
                AE = (InterpFifo(0) + InterpFifo(3))/2;    //1T.
            } else if ZCfifo has a 1 in both position 2 and position 0 {
                AE = (Interp0 + InterpFifo(2))/2;     //2T forward.
            } else if ZCfifo has a 1 in both position 2 and position 4 {
                AE = (InterpFifo(1) + InterpFifo(4))/2;    //2T backward.
            }
        }
    Shift RSH0 into RshFifo;
    Shift (Interp0 >=0 ? 1 : -1) into SlicerFifo;
    Shift Interp0 into InterpFifo;
    LastInterp = interp0;
    ZCO = ZCfifo(2);
    if NOS1 == 1 { //There is no NOS1 without NOS0.
        ZeroCrossing = ((LastInterp*Interp1<0||
        (Interp1==0&&LastInterp!=0)) ? 1 :0);
        shift ZeroCrossing into ZCfifo;
        if ZCfifo has a 1 in position 2 only {
            PE = -RshFifo(1) * SlicerFifo(1);
            AE = RshFifo(1);
        } else {    // Zerocrossings violate the d constraint.
            if ZCfifo has a 1 in position 2 and (a 1 in position 1 or 3) {
                AE = AE + (InterpFifo(0) + InterpFifo(3))) /2; //1T.
            } else if ZCfifo has a 1 in both position 2 and position 0 {
                AE = (Interp1 + InterpFifo(2)) / 2;      //2T forward.
            } else if ZCfifo has a 1 in both position 2 and position 4 {
                AE = (InterpFifo(1) + InterpFifo(4))/2;    //2T backward.
            }
        }
    Shift RSH1 into RshFifo;
    Shift (Interp1 >=0 ? 1 : -1) into SlicerFifo;
    Shift Interp1 into InterpFifo;
    LastInterp = interp1;
    ZC1 = ZCfifo(2);
    }//if NOS1 == 1
}// if NOS0 == 1
AsymmetryOut = AE;
SlicerOut = ((Interp0 >=0 ? 1 : -1) + (Interp1 >=0 ? 1 : -1)) / 2;
PhaseErrorOut = PE;
ZCOut = ZC0 + ZC1;
```

The phase error signal 630 is provided to the loop filter 625. The loop filter 625 filters the phase error signal 630 to stabilize the phase error feedback loop by producing a phase error signal 631 for the digital controlled oscillator 626. The digital controlled oscillator 626 processes the phase error signal 631 to generate the phase control signals 632 and 633 for the re-timing interpolator 622. The phase control signals 632 and 633 are respectively used by the re-timing interpolator 622 to generate signals 664 and 665.

Figure 13:
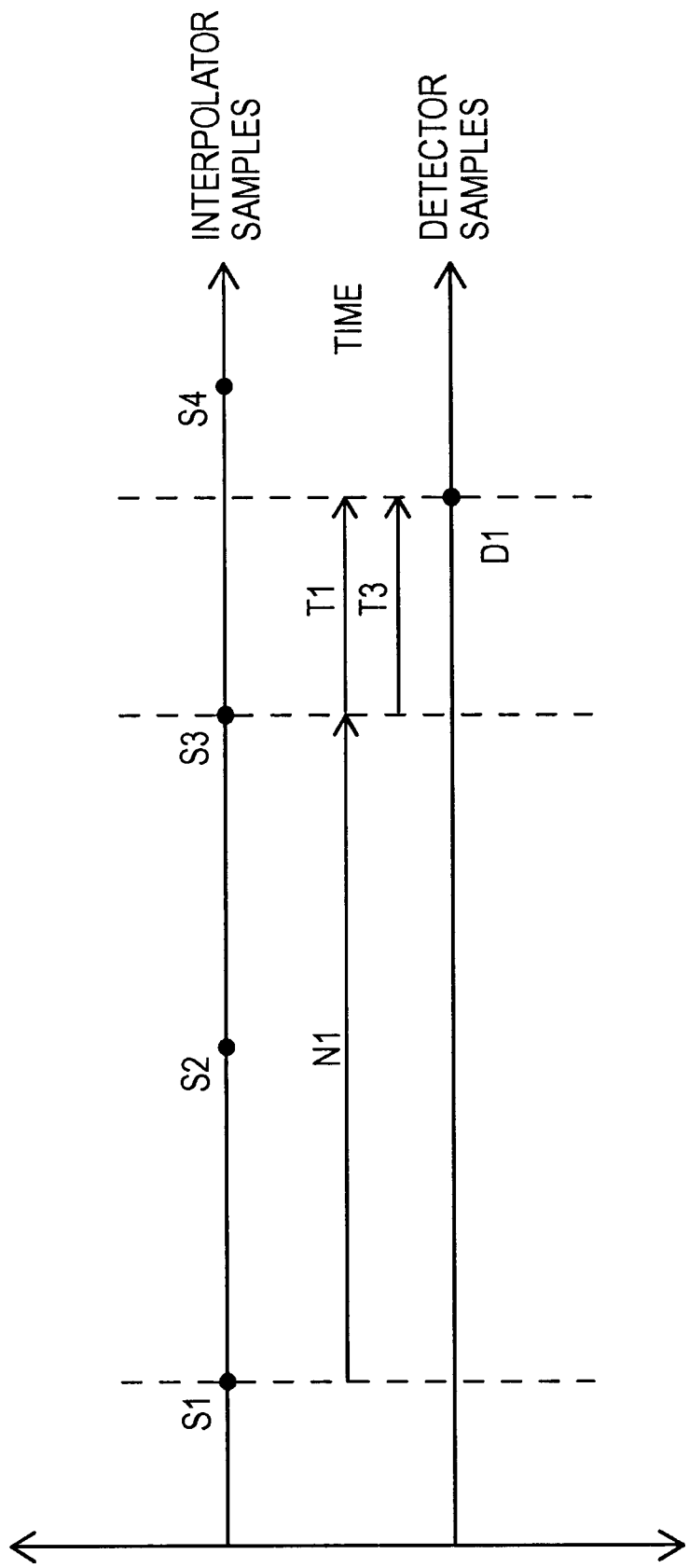
FIG. 13 is a diagram illustrating phase control in an example of the invention.

FIG. 13 depicts an example of the operation of re-timing interpolator 622 and the relation between the signals 661, 632, and 664. Samples S1–S4 are from signal 661 and the sample D1 is the next sample expected by the detector 510. For the sample S1, the phase control signal 632 identifies: 1) the number of samples (N1) before the next sample D1 is expected by the detector 110, and 2) the phase correction factor (T1) to D1 from the last sample S3 before D1. Since N1=2 for the sample S1, no re-timed sample is produced for the signal 664. Since N3=0 for the sample S3, the phase correction factor T3 is used to determine a re-timed sample for the signal 664. The effect of the moving average filter 623 should be taken into account when calculating T3, so that the resulting sample in the signal 554 occurs at the D1 time point. An example of pseudo-code for phase control follows.

```
on each decimated clock cycle {
    NOSAₖ = NOSAₖ -1
    NOSBₖ = NOSBₖ -1
    if(NOSAₖ = 0)AND (NOSBₖ = 0){
        if τₖA = 0.5 -LSB
``` ship $2\tau_{kA}$ to interpolator A for a new valid interpolated sample A.
if $\tau_{kB} < 0.5${
  $\tau_{kB} = 0.5$
}
ship $2(\tau_{kB}-0.5)$ to interpolator B for a new valid interpolated sample B.
$\tau_{k+1A} = \tau_{kB} + T_k I$ and P path used from PI filter.
if $(\tau_{k+1A} < 1)${
  $\tau_{k+1A} = 1$
}
$NOSA_{k+1} = \text{floor}(\tau_{k+1A})$
$\tau_{k+1A} = \tau_{k+1A} - NOSA_{k+1}$
$\tau_{k+1B} = \tau_{kB} + T_k + T_{ACCUk}$ Use the content of the I and PI path
if $(\tau_{k+1B} < 1.5)${
  $\tau_{k+1B} = 1.5$
}
$NOSB_{k+1} = \text{floor}(\tau_{k+1B})$
$\tau_{k+1B} = \tau_{k+1B} - NOSB_{k+1}$
}
if $(NOSA_k = 0)${
  if $(\tau_{kA} < 0.5)$
  ship $2\tau_{kA}$ to interpolator A for a new valid interpolated sample A
  }
  else{
    ship $2(\tau_{kA}-0.5)$ to interpolator B for a new valid interpolated sample B
  }
  $\tau_{k+1A} = \tau_{kB}$
  $NOSA_{k+1} = NOSB_k$
  $\tau_{k+1B} = NOSB_k + \tau_{kB} + T_k I$ and P used from PI filter
  if $(\tau_{k+1B} < 1.5)${
    $\tau_{k+1B} = 1.5$
  }
  $NOSB_{k+1} = \text{floor}(\tau_{k+1B})$
  $\tau_{k+1B} = \tau_{k+1B} - NOSB_{k+1}$
}

If the user data 503 is encoded using a run-length limited code with (2,10) constraints, then intelligent rules may be used to mitigate the effect of errors in phase calculations. Since a zero crossing represents a transition from positive to negative or from negative to positive, then another zero crossing should not occur for at least two more samples. If this rule is violated, then the phase calculation is in error and is not used, and samples generated in the presence of such error may be suppressed.

Those skilled in the art will appreciate variations of the above-described embodiments that fall within the scope of the invention. As a result, the invention is not limited to the specific examples and illustrations discussed above, but, only by the following claims and their equivalents.

What is claimed is:

1. Optical disk system circuitry comprising:
   up-sampling and re-timing circuitry configured to use a control signal to up-sample and re-time a sub-sampled signal representing user data to generate an up-sampled and re-timed signal; and
   a digital feedback loop configured to generate the control signal.

2. The optical disk system circuitry of claim 1 wherein:
   the up-sampling and re-timing circuitry is configured to up-sample the sub-sampled signal to generate an up-sampled signal and to re-time the up-sampled signal using the control signal to generate the up-sampled and re-timed signal; and
   the digital feedback loop is configured to generate the control signal to compensate for phase error between a detector and the up-sampling and re-timing circuitry.

3. The optical disk system circuitry of claim 2 wherein the digital feedback loop is configured to suppress the phase error compensation when a run length limited code constraint is violated.

4. The optical disk system circuitry of claim 1 wherein the up-sampling and re-timing circuitry is configured to compensate for asymmetry in the sub-sampled signal.

5. The optical disk system circuitry of claim 4 wherein the up-sampling and re-timing circuitry is configured to select non-consecutive samples for asymmetry error calculation when a run length limited code constraint is violated.

6. The optical disk system circuitry of claim 1 wherein the up-sampling and re-timing circuitry comprises a re-timing interpolator and wherein:
   the re-timing interpolator is configured to re-time an up-sampled signal using the control signal; and
   the digital feedback loop is configured to process an output of the re-timing interpolator to provide the control signal to the re-timing interpolator.

7. The optical disk system circuitry of claim 1 wherein the up-sampling and re-timing circuitry is configured to process consecutive samples in parallel.

8. An optical disk system comprising;
   an optical disk device configured to store user data and to transfer an analog signal representing the user data; and
   control circuitry configured to sub-sample the analog signal to generate a sub-sampled signal, to up-sample the sub-sampled signal to generate an up-sampled signal, and to re-time the up-sampled signal using a digital feedback loop to generate a re-timed signal.

9. The optical disk system of claim 8 wherein the digital feedback loop is configured to compensate for phase error.

10. The optical disk system of claim 9 wherein the control circuitry is configured to suppress the phase error compensation when a run length limited code constraint is violated.

11. The optical disk system of claim 8 wherein the control circuitry is configured to compensate for asymmetry in the sub-sampled signal.

12. The optical disk system of claim 9 wherein the control circuitry is configured to select non-consecutive samples for asymmetry error calculation when a run length limited code constraint is violated.

13. The optical disk system of claim 8 wherein the control circuitry comprises a re-timing interpolator and wherein:
   the re-timing interpolator is configured to re-time an up-sampled signal using the control signal; and the digital feedback loop is configured to process an output of the re-timing interpolator to provide the control signal to the re-timing interpolator.

14. The optical disk system of claim 8 wherein control circuitry is configured to process consecutive samples in parallel.

15. An optical read channel comprising:
an analog-to-digital converter configured to sub-sample an analog signal from an optical disk device to generate a sub-sampled signal;
an equalizer configured to equalize the sub-sampled signal to generate an equalized sub-sampled signal;
an up-sampling re-timer configured to up-sample and re-time the equalized sub-sampled signal to generate an up-sampled and re-timed signal; and
a detector configured to process the up-sampled and re-timed signal to generate an encoded signal.

16. The optical read channel of claim 15 wherein the up-sampling re-timer comprises a digital feedback loop and wherein:
the up-sampling re-timer is configured to up-sample the sub-sampled signal to generate an up-sampled signal and to re-time the up-sampled signal using a control signal to generate the up-sampled and re-timed signal; and
the digital feedback loop is configured to generate the control signal to compensate for phase error between a detector and the up-sampling re-timer.

17. The optical read channel of claim 16 wherein the up-sampling re-timer is configured to suppress phase error compensation when a run length limited code constraint is violated.

18. The optical read channel of claim 15 wherein the up-sampling re-timer is configured to compensate for asymmetry in the sub-sampled signal.

19. The optical read channel of claim 18 wherein the up-sampling re-timer is configured to select non-consecutive samples for asymmetry error calculation when a run length limited code constraint is violated.

20. The optical read channel of claim 15 wherein the up-sampling re-timer comprises a re-timing interpolator and a digital feedback loop wherein:
the re-timing interpolator is configured to re-time an up-sampled signal using a control signal; and
the digital feedback loop is configured to process an output of the re-timing interpolator to provide the control signal to the re-timing interpolator.

21. The optical read channel of claim 15 wherein the up-sampling re-timer and the detector are configured to process consecutive samples in parallel.

22. A method for operating optical disk system circuitry comprising:
up-sampling and re-timing a sub-sampled signal representing user data using a control signal to generate an up-sampled and re-timed signal; and
generating the control signal using a digital feedback loop.

23. The method of claim 22 wherein up-sampling and re-timing the sub-sampled signal and generating the control signal comprises:
up-sampling the sub-sampled signal to generate an up-sampled signal;
re-timing the up-sampled signal using the control signal to generate the up-sampled and re-timed signal; and
generating the control signal to compensate for phase error.

24. The method of claim 23 comprising suppressing the phase error compensation when a run length limited code constraint is violated.

25. The method of claim 22 comprising compensating for asymmetry in the sub-sampled signal.

26. The method of claim 25 comprising selecting non-consecutive samples for asymmetry error calculation when a run length limited code constraint is violated.

27. The method of claim 22 wherein generating the control signal comprises processing an output of a re-timing interpolator using a digital feedback loop to provide the control signal to the re-timing interpolator.

28. The method of claim 22 wherein re-timing the sub-sampled signal and generating the control signal comprises processing consecutive samples in parallel.

29. A method for operating an optical disk system comprising;
transferring an analog signal representing user data from an optical disk device to control circuitry;
sub-sampling the analog signal in the control circuitry to generate a sub-sampled signal;
up-sampling the sub-sampled signal in the control circuitry to generate an up-sampled signal; and
re-timing the up-sampled signal in the control circuitry using a digital feedback loop to generate a re-timed signal.

30. The method of claim 29 wherein re-timing the up-sampled signal comprises compensating for phase error.

31. The method of claim 30 comprising suppressing the phase error compensation when a run length limited code constraint is violated.

32. The method of claim 29 comprising compensating for asymmetry in the sub-sampled signal.

33. The method of claim 32 comprising selecting non-consecutive samples for asymmetry error calculation when a run length limited code constraint is violated.

34. The method of claim 29 wherein re-timing the up-sampled signal in the control circuitry using a digital feedback loop comprises processing an output of a re-timing interpolator to provide a control signal to the re-timing interpolator.

35. The method of claim 29 wherein re-timing the up-sampled signal comprises processing consecutive samples in parallel.

36. A method for operating an optical read channel comprising:
sub-sampling an analog signal from an optical disk device to generate a sub-sampled signal;
equalizing the sub-sampled signal to generate an equalized sub-sampled signal;
up-sampling and re-timing the equalized sub-sampled signal to generate an up-sampled and re-timed signal; and
processing the up-sampled and re-timed signal to generate an encoded signal.

37. The method of claim 36 wherein up-sampling and re-timing the equalized sub-sampled signal comprises:
up-sampling the equalized sub-sampled signal to generate an up-sampled signal;

re-timing the up-sampled signal using a control signal to generate the up-sampled and re-timed signal; and generating the control signal using a digital feedback loop to compensate for phase error between an up-sampling interpolator and a detector.

38. The method of claim 37 comprising suppressing the phase error compensation when a run length limited code constraint is violated.

39. The method of claim 36 comprising compensating for asymmetry in the equalized sub-sampled signal.

40. The method of claim 39 comprising selecting non-consecutive samples for asymmetry error calculation when a run length limited code constraint is violated.

41. The method of claim 36 wherein up-sampling and re-timing the equalized sub-sampled signal comprises:

up-sampling the equalized sub-sampled signal to generate an up-sampled signal;

re-timing the up-sampled signal using a re-timing interpolator and a control signal to generate the up-sampled and re-timed signal; and processing an output of the re-timing interpolator using a digital feedback loop to provide the control signal to the re-timing interpolator.

42. The method of claim 36 wherein re-timing the equalized sub-sampled signal and processing the up-sampled and re-timed signal comprises processing consecutive samples in parallel.

* * * * *